US012032308B2

(12) United States Patent
Hotta et al.

(10) Patent No.: US 12,032,308 B2
(45) Date of Patent: Jul. 9, 2024

(54) IMAGE FORMING APPARATUS

(71) Applicant: CANON KABUSHIKI KAISHA, Tokyo (JP)

(72) Inventors: Haruyuki Hotta, Kanagawa (JP); Masayuki Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 18/056,351

(22) Filed: Nov. 17, 2022

(65) Prior Publication Data

US 2023/0168605 A1 Jun. 1, 2023

(30) Foreign Application Priority Data

Nov. 26, 2021 (JP) ................................ 2021-191854

(51) Int. Cl.
*G03G 15/08* (2006.01)
*G03G 21/16* (2006.01)
*G03G 21/18* (2006.01)

(52) U.S. Cl.
CPC ..... *G03G 15/0862* (2013.01); *G03G 21/1652* (2013.01); *G03G 21/1825* (2013.01)

(58) Field of Classification Search
CPC ............... G03G 15/0862; G03G 15/80; G03G 21/1652; G03G 21/1867; G03G 2221/166
See application file for complete search history.

(56) References Cited

U.S. PATENT DOCUMENTS 5,752,145 A * 5/1998 Nakaue .............. G03G 15/0889 399/256
2012/0189326 A1* 7/2012 Yoshida ............ G03G 15/0856 399/27
2015/0355573 A1* 12/2015 Jeong ................ G03G 15/0856 399/58
2021/0080861 A1* 3/2021 Shimizu ............ G03G 21/1676
2021/0311433 A1* 10/2021 Wang ................ G03G 15/0921

FOREIGN PATENT DOCUMENTS

JP 2003295596 A 10/2003

* cited by examiner

*Primary Examiner* — Carla J Therrien
(74) *Attorney, Agent, or Firm* — Canon U.S.A., Inc. IP Division

(57) ABSTRACT

An image forming apparatus includes (i) a housing including a first connector, (ii) a drum unit, (iii) a development unit including a containing portion containing toner and movable between an abutment position and a separation position, (iv) a detection unit including a light emitting element, a light receiving element, and a second connector electrically connected to the light emitting element and the light receiving element, and mounted on the development unit, and (v) a connection member connected to the first connector and the second connector to electrically connect the first connector and the second connector each. A length of the connection member is longer than a first distance from the first connector to the second connector when the development unit is located at the abutment position, and is longer than a second distance from the first connector to the second connector when the development unit is located at the separation position.

18 Claims, 10 Drawing Sheets

6B-6B

IMAGE FORMING APPARATUS

BACKGROUND

Field of the Disclosure

The present disclosure relates to an image forming apparatus using the electrophotographic method.

Description of the Related Art

In an electrophotographic image forming apparatus, an electrostatic latent image formed on the surface of a photosensitive drum is developed using toner as a developer.

Japanese Patent Application Laid-Open No. 2003-295596 discloses a configuration in which a development unit including a toner container containing toner and a development roller is movable in such a manner that the development roller is brought into contact with a photosensitive drum and separated from the photosensitive drum. Further, Japanese Patent Application Laid-Open No. 2003-295596 also discloses a configuration in which the toner container is irradiated with light from a light emitting element of the apparatus main body and the light transmitted through the toner container is received by a light receiving element to detect the amount of the toner contained in the toner container.

In the image forming apparatus discussed in Japanese Patent Application Laid-Open No. 2003-295596, the light emitting element and the light receiving element are disposed on the apparatus main body and are not fixed relative to the development unit, and therefore a variation may occur in the positions of the light emitting element and the light receiving element relative to the development unit.

SUMMARY

Aspects of the present disclosure allow an image forming apparatus including a movably configured development unit to prevent a variation in the positions of a light emitting element and a light receiving element relative to the development unit.

One aspect of the disclosure is configured in the following manner.

An image forming apparatus configured to form an image on a recording material includes a housing including a first connector, a drum unit that includes a photosensitive drum and is contained in the housing, a development unit that includes a containing portion containing toner and a development roller configured to supply the toner to the photosensitive drum and is contained in the housing and movable relative to the drum unit between (i) an abutment position at which the development roller is in abutment with the photosensitive drum and (ii) a separation position at which the development roller is separated from the photosensitive drum, a light emitting element mounted on the development unit, a light receiving element mounted on the development unit and configured to receive light emitted from the light emitting element and transmitted through the containing portion, a second connector mounted on the development unit and electrically connected to the light emitting element and the light receiving element, and a connection member connected to the first connector and the second connector so that the first connector and the second connector are electrically connected to each other, wherein the second connector is displaced relative to the first connector when the development unit is moved between the abutment position and the separation position, and wherein a length of the connection member is longer than a first distance from the first connector to the second connector when the development unit is located at the abutment position, and is longer than a second distance from the first connector to the second connector when the development unit is located at the separation position.

Further features of the present disclosure will become apparent from the following description of exemplary embodiments with reference to the attached drawings.

DESCRIPTION OF THE EMBODIMENTS

Figure 1:
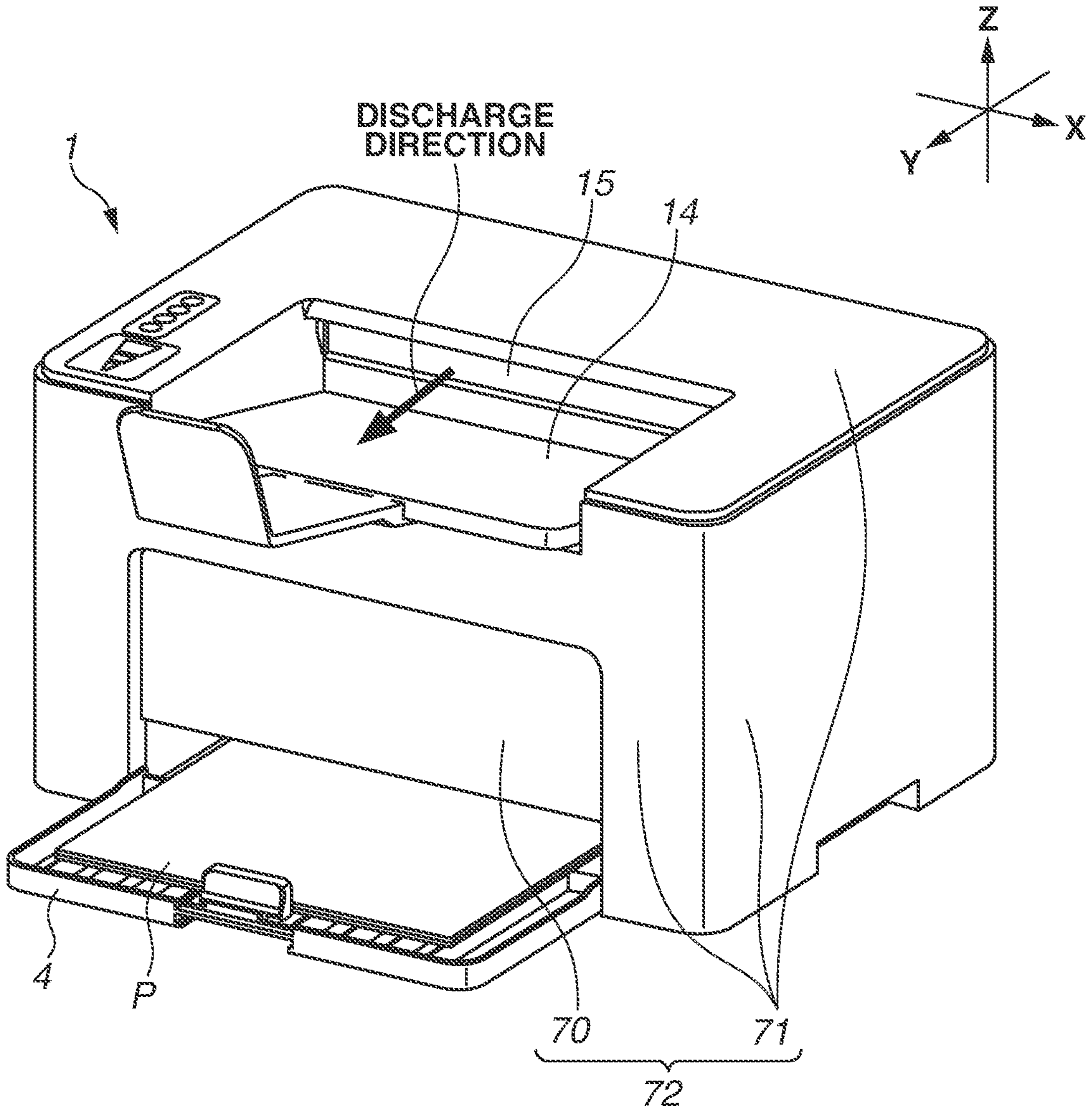
FIG. 1 is a perspective view of an image forming apparatus.

In the following description, configurations for implementing the present disclosure will be described in detail based on exemplary embodiments thereof with reference to the drawings. However, dimensions, materials, shapes, a relative layout, and the like of components that will be described in these exemplary embodiments shall be changed as appropriate according to the configuration of an apparatus to which the disclosure is applied and various kinds of conditions. In other words, they are not intended to limit the scope of the present disclosure to the following exemplary embodiments. Further, in the drawings that will be used in the following description, a component or a part of a component may be omitted or simplified for illustrative purposes.

<Overall Configuration of Image Forming Apparatus>

The overall configuration of an image forming apparatus 1 according to a first exemplary embodiment will be described with reference to FIGS. 1 and 2.

The image forming apparatus 1 according to the present exemplary embodiment is a monochrome laser beam printer using the electrophotographic process. The image forming apparatus 1 can perform an image forming operation of forming an image on a recording material P using a developer (toner) in accordance with image information transmitted from an external apparatus such as a personal computer. Examples of the recording material P include recording paper, label paper, an overhead projector (OHP) sheet, and a cloth.

In the following description, a Z direction will be defined to be the height direction (the direction opposite from the direction of gravitational force) of the image forming apparatus 1 when the image forming apparatus 1 is set up on a horizontal surface. An X direction will be defined to be a direction intersecting with the Z direction and extending in parallel with a rotational axis direction (a main scanning direction) of a photosensitive drum 11, which will be described below. A Y direction will be defined to be a direction intersecting with the X direction and the Z direction. Desirably, the X direction, the Y direction, and the Z direction perpendicularly intersect with one another. Further, for the sake of convenience, a positive side and a negative side in the X direction will be referred to as a right side and a left side, respectively. A positive side and a negative side in the Y direction will be referred to as a front side or a front surface side and a back side or a back surface side, respectively. A positive side and a negative side in the Z direction will be referred to as an upper side and a lower side, respectively. In the present exemplary embodiment, the Z direction is in parallel with the vertical direction, and the X direction and the Y direction are in parallel with the horizontal direction.

Figure 2:
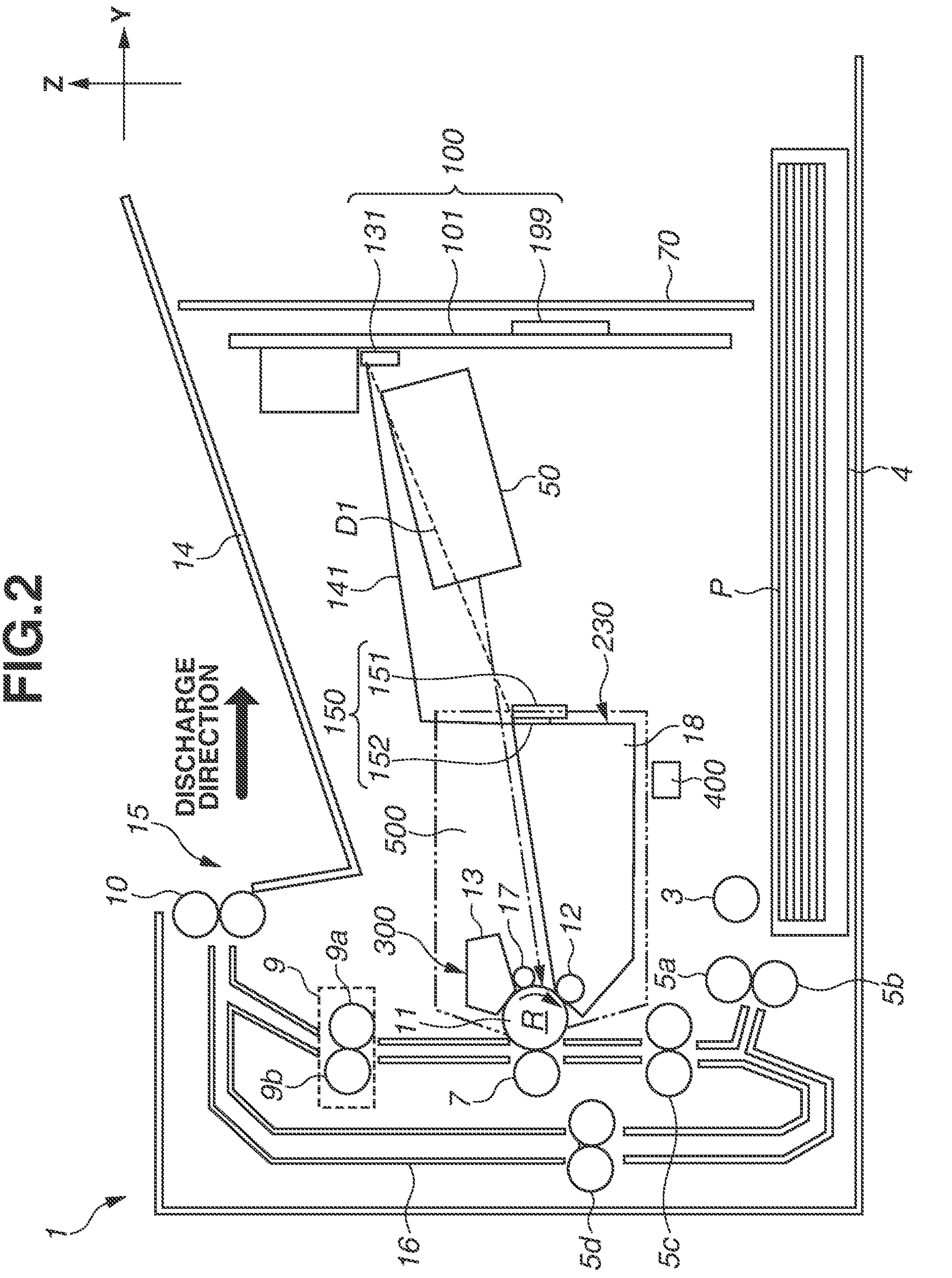
FIG. 2 illustrates the internal configuration of the image forming apparatus.

FIG. 1 illustrates a perspective view of the image forming apparatus 1, and FIG. 2 illustrates the internal configuration of the image forming apparatus 1 as viewed from the X direction (the rotational axis direction of the photosensitive drum 11). FIG. 2 mainly illustrates members relating to an image forming process.

In FIG. 1, the image forming apparatus 1 includes a feeding tray 4, in which the recording material P is contained, and a discharge tray (an opening/closing member) 14, on which the discharged recording medium P is stacked. The feeding tray 4 is configured to be pulled out in the Y direction, and a user can replenish the recording material P therein. The recording material P fed from the feeding tray 4 and subjected to image formation is discharged from a discharge port 15 toward a discharge direction illustrated in FIG. 1, and is stacked on the discharge tray 14. In the present exemplary embodiment, the discharge direction is in parallel with the Y direction.

A front cover 70 is provided at a part of the end surface (a part of the front surface) of the image forming apparatus 1 on the downstream side in the discharge direction, and covers a control board 100 therewith. An exterior cover 71 is provided at a part of the front surface except for the portion where the front cover 70 is provided, and the side surface and the top surface of the image forming apparatus 1. The front cover 70, the exterior cover 71, and the above-described discharge tray 14 form a housing (an apparatus main body or a main body frame member) 72 of the image forming apparatus 1 together. Now, the housing 72 is a member covering the entire the image forming apparatus 1, and includes therein, for example, a scanner unit 50 and a process unit 500, which will be described below. The above-described discharge port 15 is an opening formed on a part of the housing 72, and the recording material P is discharged outside the image forming apparatus 1 through this opening. The recording material P discharged from the discharge port 15 is stacked on an upper surface portion (a stacking portion) provided to the discharge tray 14.

The image forming apparatus 1 includes the process unit 500, which includes a photosensitive unit (a drum unit) 300 and a development unit 230. The process unit 500 is contained in the housing 72. The photosensitive unit 300 includes the photosensitive drum 11 and a charging roller (a charging member) 17.

The development unit 230 includes a containing portion 18 containing toner, and a development roller 12. The photosensitive drum 11 is an image bearing member that bears an electrostatic latent image thereon. The development roller 12 is a developer bearing member that bears toner as a developer. The development roller 12 develops the electrostatic latent image formed on the photosensitive drum 11 using the toner by supplying the toner onto the photosensitive drum 11. In the present exemplary embodiment, the development roller 12 develops the electrostatic latent image in a state of being in abutment with the photosensitive drum 11 as illustrated in FIG. 2.

As described above, the housing 72 contains the process unit 500 (the photosensitive unit 300 and the development unit 230), and is provided with the discharge tray 14. The discharge tray 14 is attached to the exterior cover 71.

A flow of the image forming operation (the image forming process) to be performed on the recording material P will be described with reference to FIG. 2. When the image information is transmitted to the image forming apparatus 1, the photosensitive drum 11, which is a rotational member, is rotationally driven at a predetermined circumferential speed (a process speed) in a direction indicated by an arrow R based on a print start signal.

The scanner unit 50 irradiates the photosensitive drum 11 with laser light based on the input image information. The scanner unit 50 includes a laser oscillator that outputs the laser light, a polygon mirror and a lens for irradiating the photosensitive drum 11 with the laser light, a scanner motor for rotating the polygon mirror, and a frame that supports these members.

The photosensitive drum 11 is charged by the charging roller 17 in advance, and an electrostatic latent image is formed thereon when photosensitive drum 11 is irradiated with the laser light. After that, the toner contained in the containing portion 18 is conveyed to the photosensitive drum 11 by the development roller 12, by which the electrostatic image is developed and a toner image is formed on the photosensitive drum 11.

The recording material P is fed from the feeding tray 4 in parallel with the above-described image forming process. A pickup roller 3, a feeding roller 5*a*, and a conveyance roller pair 5*c* are provided on a conveyance path in the image forming apparatus 1. The pickup roller 3 is in contact with the recording material P located on the uppermost position among the recording materials P contained in the feeding tray 4, and feeds the recording material P as the pickup roller 3 itself rotates. The feeding roller 5*a* and a separation roller 5*b* in pressure contact therewith form a separation nip. If a plurality of recording materials P is accidentally fed to the separation nip due to the influence of a frictional force between the recording materials P, the feeding roller 5*a* and the separation roller 5*b* separate the plurality of recording material P, and feed only the recording material P located on the uppermost position to the downstream side.

The recording material P fed from the feeding tray 4 is conveyed toward a transfer roller 7 by the conveyance roller pair 5*c*. The toner image formed on the photosensitive drum 11 is transferred onto the recording material P with a transfer bias applied to the transfer roller 7. The recording material P with the toner image transferred thereon by the transfer roller 7 is subjected to heating and pressing processing by a fixing device 9, and the toner image is then fixed onto the recording material P. The fixing device 9 includes a heating roller 9*a*, which includes a fixing heater built therein, and a pressing roller 9*b*, which is biased toward the heating roller 9*a*. Then, the recording material P with the toner image fixed thereon is discharged onto the discharge tray 14 by a discharge roller pair 10.

In a case where images are formed on the both sides of the recording material P, the discharge roller pair 10 guides the recording material P to a two-sided conveyance path 16 by causing the recording material P with the image formed on a first surface thereof to be switched back.

The recording material P guided to the two-sided conveyance path 16 is conveyed toward the transfer roller 7 again by a two-sided conveyance roller pair 5*d* and the conveyance roller pair 5*c*. The recording material P is discharged onto the discharge tray 14 by the discharge roller pair 10 after an image is formed on a second surface thereof on the back of the first surface by the transfer roller 7.

After the toner image is transferred onto the recording material P, the toner remaining on the photosensitive drum 11 is removed by a cleaning unit 13.

The housing 72 includes the control board 100. The control board 100 includes a wiring board (a first board, a first board unit, or a first printed-circuit board) 101, a control unit (a central processing unit (CPU) or an arithmetic device) 199, and a connector (a first connection unit or a main body-side connection unit) 131. The control unit 199 and the connector 131 are mounted on the wiring board 101 by soldering, and the control unit 199 and the connector 131 are electrically connected to each other.

A detection unit 150 is mounted on the development unit 230. The detection unit 150 includes a wiring board (a second board, a second board unit, or a second printed-circuit board) 151, a connector (a second connection unit or a unit-side connection unit) 152, and a toner remaining amount sensor 51, which will be described below. The connector 152 and the toner remaining amount sensor 51 (a light emitting unit 51*a* and a light receiving unit 51*b*, which will be described below) are mounted on the wiring board 151 by soldering, and the connector 152 and the toner remaining amount sensor 51 are electrically connected to each other.

The control unit 199 controls the operation of the image forming apparatus 1, thereby performing the image forming operation onto the recording material P. As illustrated in FIG. 2, the control board 100 is arranged in such an orientation that the surface of the wiring board 101 intersects with the discharge direction. Further, the wiring board 101 is provided between the front cover 70 and the scanner unit 50 in the discharge direction. The detection unit 150 and the control board 100 are disposed at positions where they face each other in the present exemplary embodiment, but may be disposed at positions where they do not face each other.

The image forming apparatus 1 includes a connection member 141 connected to the connector 131 (first connector) and the connector 152 (second connector) so that the connector 131 and the connector 152 are electrically connected to each other. The connection member 141 has a function as a signal input/output line that electrically connects the control board 100 and the detection unit 150 via the connector 152 and the connector 131.

An electric wire including a conductor covered with an insulation layer is desirably used as the connection member 141. Examples usable as the connection member 141 include a plurality of electric wires, a cable into which a plurality of electric wires is bundled, and a wire harness consisting of a plurality of electric wires with connector members mounted at both the ends thereof. Further, a flexible flat cable can also be used as the connection member 141.

<Abutment/separation Operation of Development Roller>

Figure 3:
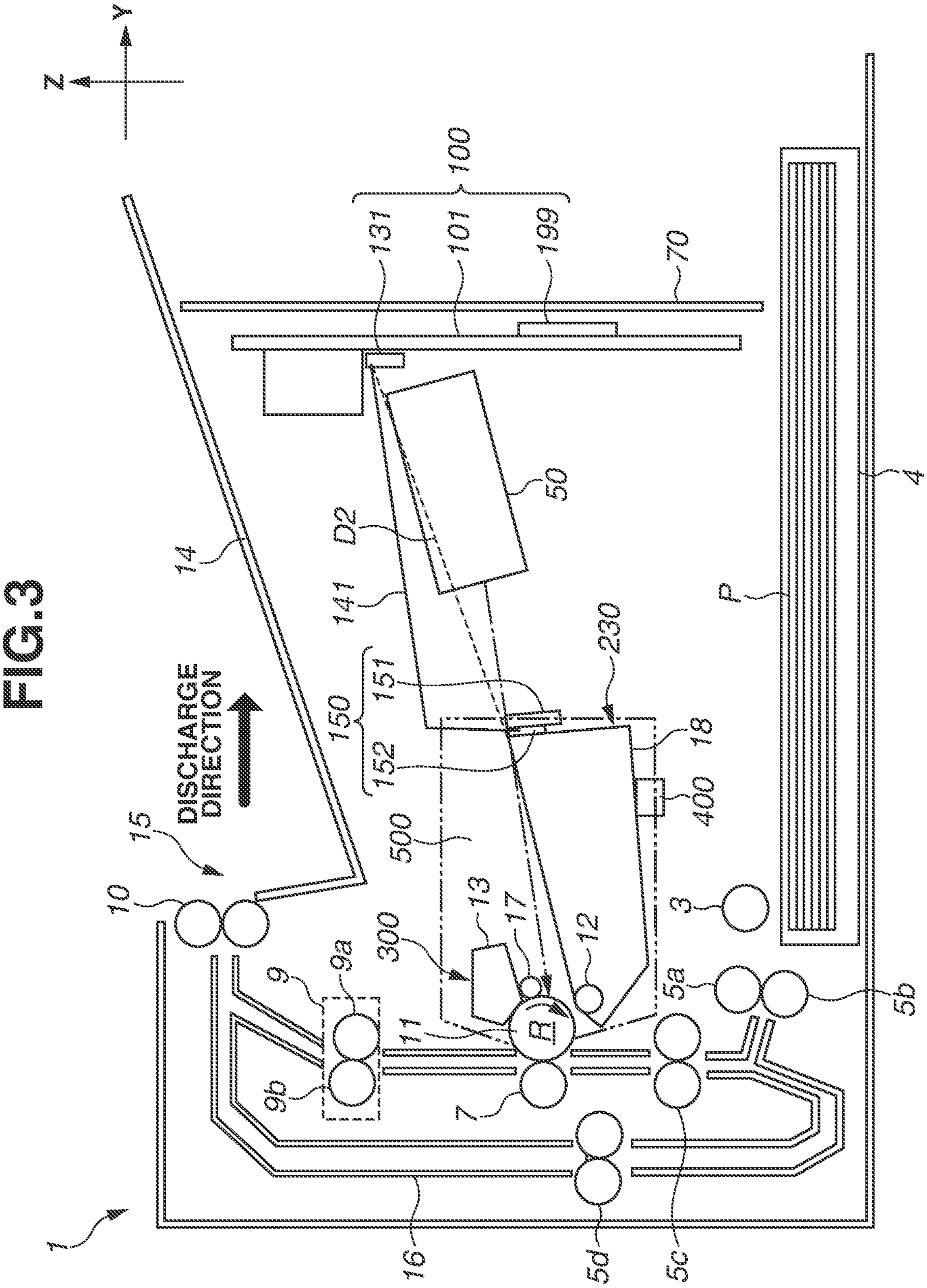
FIG. 3 illustrates the internal configuration of the image forming apparatus.

An abutment/separation operation of the development roller 12 with/from the photosensitive drum 11 will be described with reference to FIGS. 2 and 3. FIG. 3 illustrates the internal configuration of the image forming apparatus 1 as viewed from the X direction (the rotational axis direction of the photosensitive drum 11).

The development unit 230 is moveable relative to the housing 72 and the photosensitive unit 300. In other words, the development unit 230 is movable relative to the photosensitive drum 11. The development unit 230 is movable to an abutment position (a first position) (FIG. 2), at which the development roller 12 is in abutment with the photosensitive drum 11, and a separation position (a second position) (FIG. 3), at which the development roller 12 is separated from the photosensitive drum 11, by being moved relative to the photosensitive unit 300.

A movement unit (a development movement unit or a movement device) 400, which moves the development unit 230 to the abutment position and the separation position, is provided in the housing 72. In the present exemplary embodiment, the development unit 230 is moved from the abutment position to the separation position by the movement unit 400 pushing the development unit 230, and is moved from the separation position to the abutment position by the movement unit 400 being separated from the development unit 230. However, the present exemplary embodiment is not limited thereto. For example, the development unit 230 may be configured to be moved from the separation position to the abutment position by the movement unit 400 pushing the development unit 230, and be moved from the abutment position to the separation position by the movement unit 400 being separated from the development unit 230. Alternatively, the development unit 230 may be configured to be moved from the separation position to the abutment position and from the abutment position to the separation position by the movement unit 400 pushing the development unit 230.

The development roller 12 and the photosensitive drum 11 can be protected by separating the development roller 12 from the photosensitive drum 11 as appropriate.

In the present exemplary embodiment, the wiring board 101 and the wiring board 151 face each other when the development unit 230 is located in at least one of the abutment position and the separation position.

<Irradiation Region of Scanner>

Figure 4:
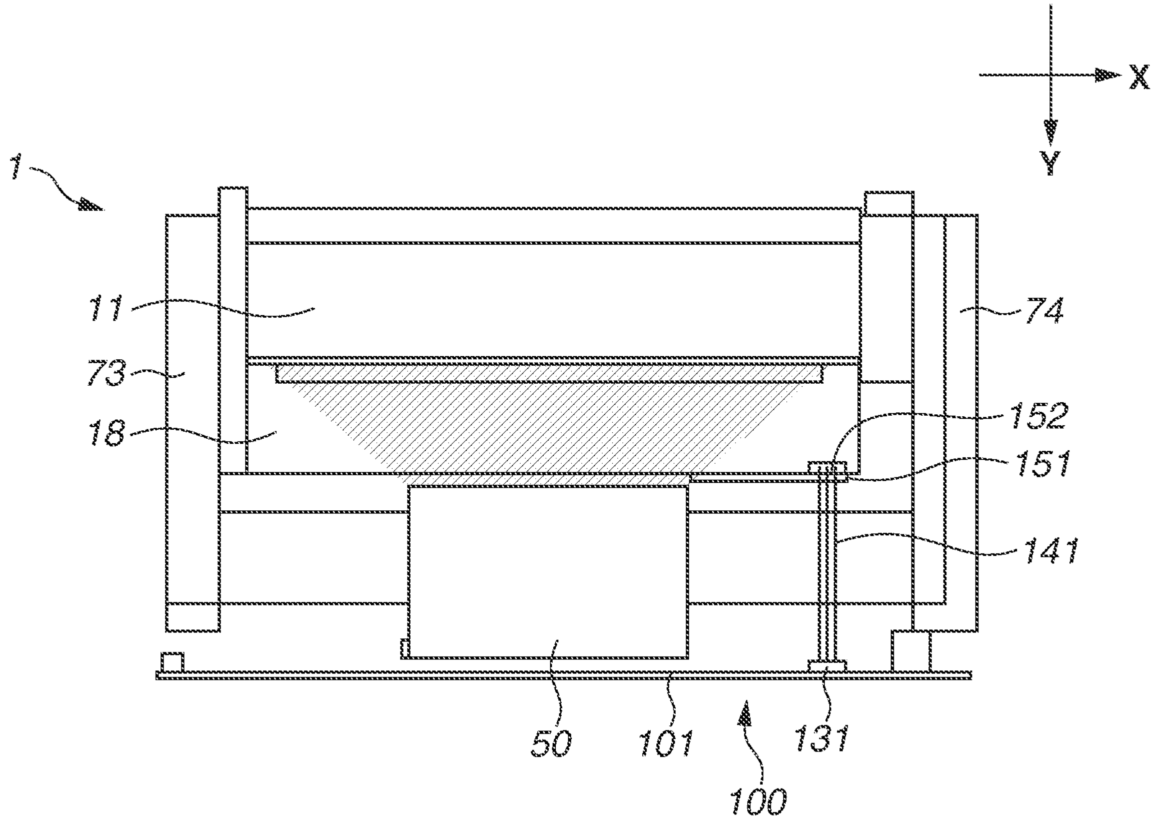
FIG. 4 is a top view of the image forming apparatus.

FIG. 4 is a top view of the image forming apparatus 1 with the exterior cover 71 removed therefrom. The housing 72 includes side walls 73 and 74. The connection member 141 is disposed so as to avoid a region irradiated with the laser emitted from the scanner unit 50 (a grid-like hatched portion in FIG. 4). More specifically, the connection member 141 is located outside the region irradiated with the laser emitted from the scanner unit 50 in the rotational axis direction of the photosensitive drum 11.

<Configuration of Process Unit>

Figure 5A:
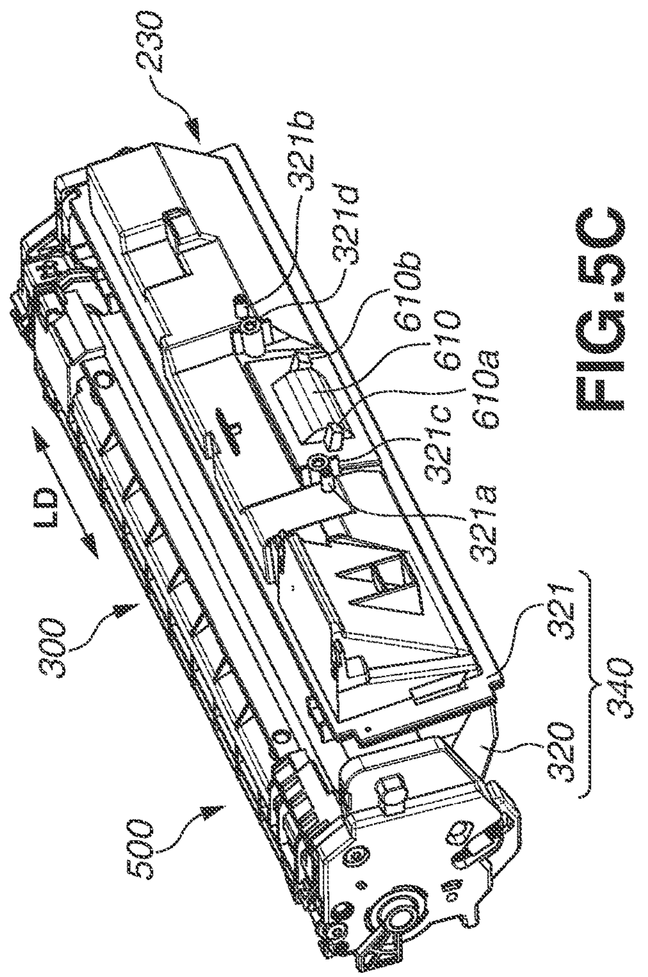
FIG. 5A is a perspective view illustrating a process unit.
Figure 5C:
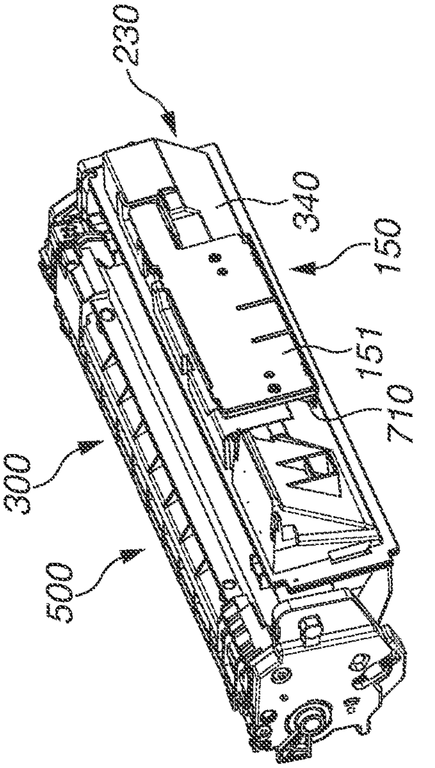
FIG. 5C is a perspective view illustrating the process unit with the wiring board and the board holding member mounted thereon.
Figure 5B:
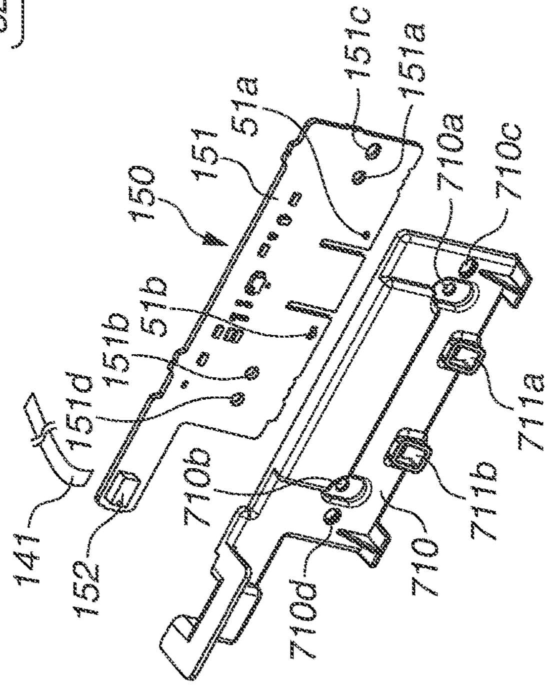
FIG. 5B is a perspective view illustrating a wiring board and a board holding member.
Figure 6A:
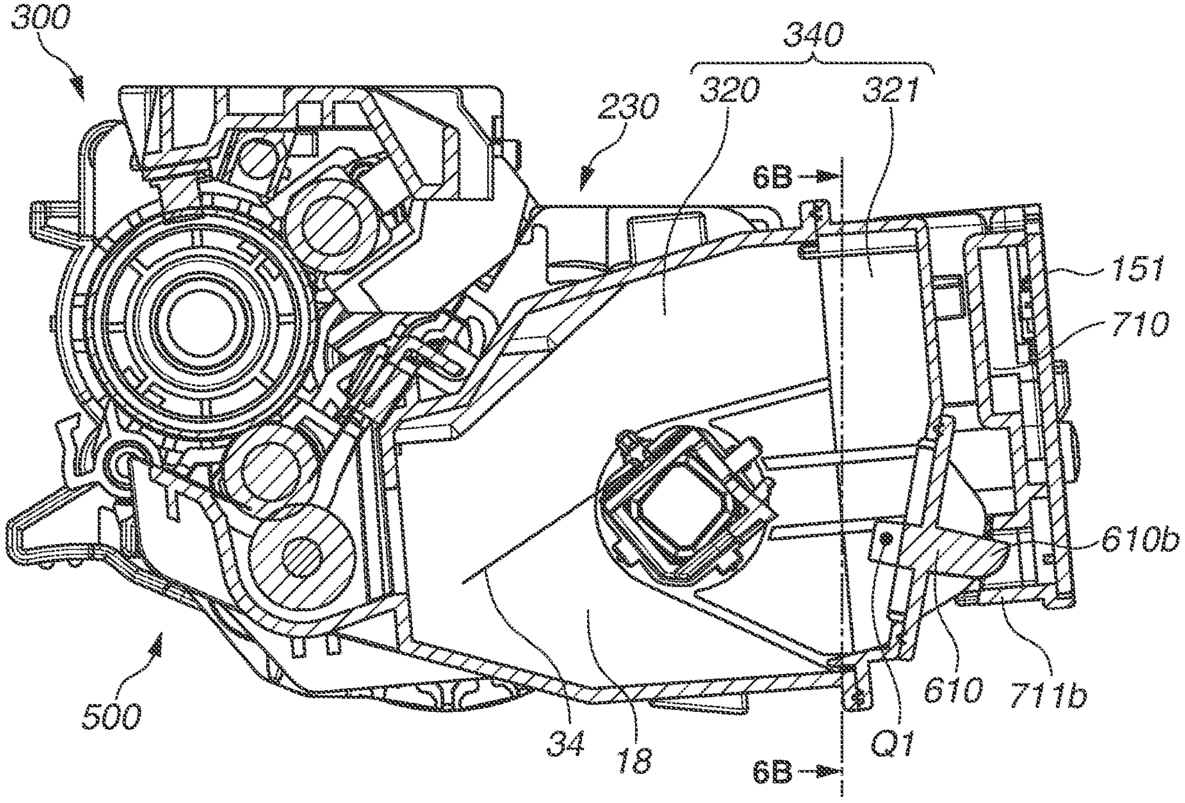
FIG. 6A is a cross-sectional view of the process unit.
Figure 6B:
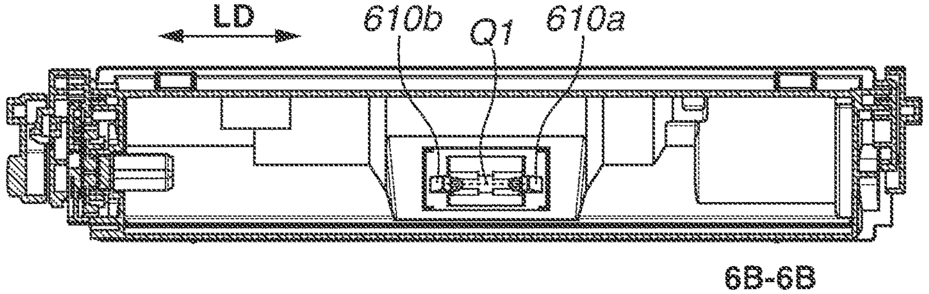
FIG. 6B is a cross-sectional view of the process unit.

The process unit 500 will be described with reference to FIGS. 5A to 5C, and 6A and 6B. FIG. 5A is a perspective view illustrating the process unit 500. FIG. 5B is a perspective view illustrating the wiring board 151 and a board holding member 710, and FIG. 5C is a perspective view illustrating the process unit 500 with the wiring board 151 and the board holding member 710 mounted thereon. FIGS. 6A and 6B are cross-sectional views of the process unit 500. FIG. 6A is a cross-sectional view in a direction perpendicular to the axial direction of the development roller 12, and FIG. 6B is a cross-sectional view taken along a line 6B-6B in FIG. 6A.

As illustrated in FIG. 5A, the development unit 230 of the process unit 500 includes a development container 320 and a development cover 321. The development container 320 and the development cover 321 are joined to each other, and form a frame member (a development frame member) 340 of the development unit 230. The containing portion 18 (refer to FIGS. 2 and 3), which contains toner, is provided in the frame member 340. The development roller 12 is supported by the frame member 340.

The development cover 321 forming a part of the frame member 340 includes board positioners 321*a* and 321*b* and board fixation portions 321*c* and 321*d*, and a light guide (a light guide member or a light path formation member) 610 is set at a position between the board fixation portions 321*c* and 321*d* of the development cover 321.

The light guide 610 includes a first guide portion 610*a* and a second guide portion 610*b*, and the first guide portion 610*a* guides light emitted from the light emitting unit 51*a*, which will be described below, into the containing portion 18 of the frame member 340. The second guide portion 610*b* guides the light transmitted through the first guide portion 610*a* and the inside of the containing portion 18 to the light receiving unit 51*b*, which will be described below.

The board positioners 321*a* and 321*b* as a positioning portion are disposed on the outer side of the board fixation portions 321*c* and 321*d*, respectively, in a longitudinal direction LD of the frame member 340. The longitudinal direction LD of the frame member 340 is the same as a longitudinal direction LD of the process unit 500, and is the same as the rotational axis direction of the photosensitive drum 11 and the rotational axis direction of the development roller 12 as well.

In the present exemplary embodiment, the wiring board 151 and the board holding member 710 are attached to the development cover 321 as illustrated in FIG. 5C. The board holding member 710 is attached to the development cover 321 in a state of being interposed between the development cover 321 and the wiring board 151.

The detection unit 150 is mounted on the development unit 230. The detection unit 150 includes the light emitting unit (a light emitting element) 51*a*, the light receiving unit (a light receiving element) 51*b* configured to receive the light emitted from the light emitting unit 51*a* and transmitted through the inside of the containing portion 18 via the light guide 610, and the connector 152. The light emitting unit 51*a* and the light receiving unit 51*b* are electrically connected to the connector 152.

The light emitting unit 51*a* and the light receiving unit 51*b*, and the connector 152 are mounted on the wiring board 151 as illustrated in FIG. 5B. A light emitting diode (LED) is used as the light emitting unit 51*a*, and a phototransistor configured to be switched to an ON state in reaction to the light from the LED is used as the light receiving unit 51*b* in the present exemplary embodiment, but the light emitting unit 51*a* and the light receiving unit 51*b* are not limited thereto. For example, a halogen lamp or a fluorescent lamp may be employed as the light emitting unit 51*a*, and a photodiode or an avalanche photodiode may be employed as the light receiving unit 51*b*. The connection member 141 is connected to the connector 152. Due to this connection, the light emitting unit 51*a* and the light receiving unit 51*b* are electrically connected to the connector 131 via the connector 152 and the connection member 141. This allows power to be supplied to the light emitting unit 51*a* and also allows a signal output from the light receiving unit 51*b* to be transmitted to the control board 100.

Further, the wiring board 151 includes positioning holes 151*c* and 151*d*, which the board positioners 321*a* and 321*b* are inserted through and fitted in, and board fixation holes 151*a* and 151*b*, which screws, fixed to the board fixation portions 321*c* and 321*d*, can pass through.

Further, the board holding member 710 also includes positioning holes 710*c* and 710*d*, which the board positioners 321*a* and 321*b* are inserted through and fitted in, and board fixation holes 710*a* and 710*b*, which the screws, fixed to the board fixation portions 321*c* and 321*d*, can pass through. Further, the board holding member 710 includes a first hole portion 711*a*, in which the first guide portion 610*a* of the light guide 610 is inserted, and a second hole portion 711*b*, in which the second guide portion 610*b* of the light guide 610 is inserted. The first hole portion 711*a* and the second hole portion 711*b* are tubularly shaped. The board holding member 710, serving as a holder, holds the wiring board 151.

The board holding member 710 is positioned relative to the development cover 321 by the board positioners 321*a* and 321*b* of the development cover 321 being inserted through and fitted in the positioning holes 710*c* and 710*d*, respectively.

Further, the wiring board 151 is positioned relative to the development cover 321 by the board positioners 321*a* and 321*b* of the development cover 321 being inserted through and engaged with the positioning holes 151*c* and 151*d*, respectively. The board positioners 321*a* and 321*b* are used in common for positioning the board holding member 710 and the wiring board 151 in this manner, by which the development cover 321, and the board holding member 710 and the wiring board 151 can be further accurately positioned.

Further, the screws are inserted in the board fixation holes 710*a*, 710*b*, 710*c*, and 710*d* and are fixed to the board fixation portions 321*c* and 321*d* of the development cover 321 with the board holding member 710 and the wiring board 151 positioned relative to the development cover 321. As a result, the board holding member 710 and the wiring board 151 are fixed to the development cover 321 using one screw, and the board holding member 710 and the wiring board 151 are fixed to the development cover 321.

When the board holding member 710 and the wiring board 151 are attached to the development cover 321, the first guide portion 610*a* of the light guide 610 is inserted in the first hole portion 711*a* of the board holding member 710. Then, the first guide portion 610*a* is positioned at a position near the light emitting unit 51*a* of the wiring board 151. Similarly, the second guide portion 610*b* of the light guide 610 is inserted in the second hole portion 711*b* of the board holding member 710. Then, the second guide portion 610*b* is positioned at a position near the light receiving unit 51*b* of the wiring board 151.

The board holding member 710 and the wiring board 151 are accurately positioned relative to the development cover 321 as described above, and this ensures that the light emitted from the light emitting unit 51*a* is guided by the first guide portion 610*a*. Then, the light guided by the first guide portion 610*a* into the containing portion (a containing chamber) 18 inside the frame member 340 is transmitted from the first guide portion 610*a* in the longitudinal direction LD.

Then, the light advancing along the light path Q1 inside the containing portion 18 is guided outside the frame member 340 by the second guide portion 610*b*. The second guide portion 610*b* is disposed near the light receiving unit 51*b*, and this ensures that the light output from the second guide portion **610*b* is received by the light receiving unit 51*b*. Therefore, the toner remaining amount can be detected using the light emitting unit 51*a* and the light receiving unit 51*b*** with improved accuracy.

Now, the layout of the light emitting unit **51*a* and the light receiving unit 51*b* will be described in further detail. In the frame member 340, the light emitting unit 51*a* and the light receiving unit 51*b* are disposed at an end portion opposite from the end portion at which the development roller 12 is disposed. Further, the light emitting unit 51*a* and the light receiving unit 51*b* are provided at the central portion of the containing portion 18 in the longitudinal direction LD. The toner remaining amount in the containing portion 18 can be excellently detected due to the provision of the light emitting unit 51*a* and the light receiving unit 51*b* at the central portion of the containing portion 18. More specifically, the developer (the toner) may be unevenly distributed at the end portion of the containing portion 18 in the longitudinal direction LD but is less distributed at the central portion of the containing portion 18**, and therefore the actual toner remaining amount can be detected.

When the development unit 230 is moved between the abutment position and the separation position, the frame member 340 is also moved. Since the detection unit 150 is fixed to the frame member 340 via the wiring board 151, the detection unit 150 is also moved (displaced) relative to the photosensitive unit 300 and the control board 100 of the housing 72 together with the development unit 230 when the development unit 230 is moved between the abutment position and the separation position. The detection unit 150 is mounted on the development unit 230 in such a manner that the connector 152 is displaced relative to the connector 131 when the development unit 230 is moved between the abutment position and the separation position.

<Detection of Toner Remaining Amount>

The control unit 199 performs a detection operation (detection of the toner remaining amount) to detect the amount of the toner contained in the containing portion 18 based on the signal output from the light receiving unit **51*b***.

Figure 7:
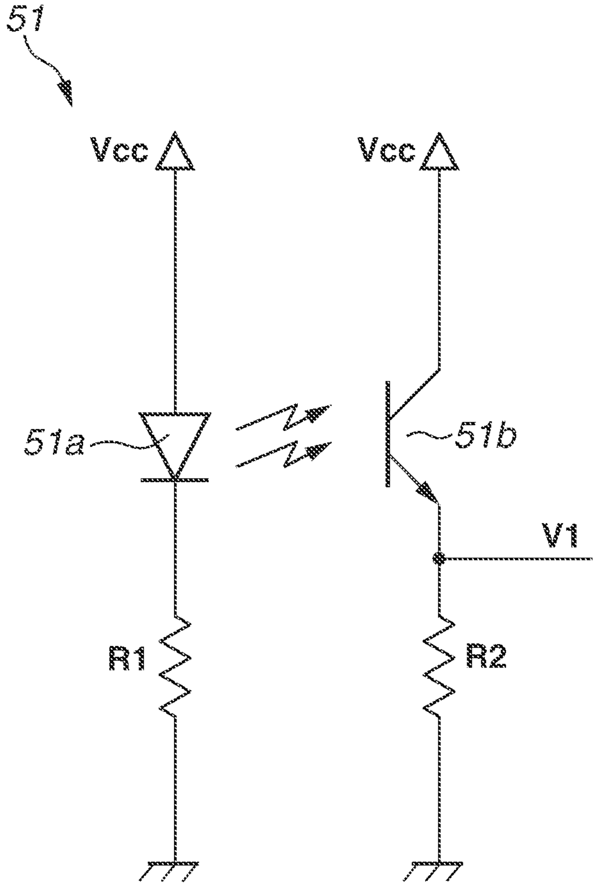
FIG. 7 is a circuit diagram illustrating a toner remaining amount detection sensor.

FIG. 7 is a circuit diagram illustrating an example of the circuit configuration of the toner remaining amount sensor 51 mounted on the detection unit 150. The toner remaining amount sensor 51 includes the light emitting unit **51*a* and the light receiving unit 51*b***.

The light emitting unit **51*a* and the light receiving unit 51*b* are connected to the connector 131 of the control board 100 via the connector 152 and the connection member 141**.

A power supply voltage Vcc and a current-limiting resistor R1 are connected to the light emitting unit **51*a*, and the light emitting unit 51*a* emits the light with a current determined by the current-limiting resistor R1. The light emitted from the light emitting unit 51*a* passes through the light path Q1 (not illustrated in FIG. 7), and is received by the light receiving unit 51*b*. A power supply voltage Vcc and a detection resistor R2 are connected to a collector terminal and an emitter terminal of the light receiving unit 51*b*, respectively. The light receiving unit 51*b*, which is the phototransistor, receives the light emitted from the light emitting unit 51*a* and outputs a signal (a current) in accordance with the quantity of the received light. This signal is converted into a voltage V1 by the detection resistor R2, and is input to an analog-digital (A/D) conversion unit (not illustrated) of the control unit 199 included in the control board 100**.

In other words, the light receiving unit **51*b* changes the output value in accordance with the amount of the toner (the developer) contained in the containing portion 18**.

Mounting the toner remaining amount sensor 51 of the detection unit 150 on the development unit 230 as described above allows the distance of the light path Q1 to be reduced as compared to when the toner remaining amount sensor 51 is mounted on the housing 72. The present configuration allows the positional accuracy of the light emitting unit **51*a* and the light receiving unit 51*b* relative to the light path Q1 to be improved compared to the configuration in which the toner remaining amount sensor 51 is mounted on the housing 72. In other words, the present configuration contributes to a reduction in a variation when the light receiving unit 51*b* receives the light emitted from the light emitting unit 51*a***, thereby improving the accuracy of the detection of the toner.

The control unit 199 determines whether the light is received by the light receiving unit **51*b* from the light emitting unit 51*a* based on the input voltage level. When a stirring member 34 (refer to FIG. 6A) contained in the containing portion 18 is rotated and the toner is stirred for a predetermined time thereby, the control unit 199 can calculate the amount of the toner in the containing portion 18 based on the length of time during which the light receiving unit 51*b*** detects the light and the intensity of the light.

<Length of Connection Member>

When the development unit 230 is moved between the abutment position and the separation position, the connector 152 is displaced relative to the connector 131 as described above, and thus the distance between the connector 152 and the connector 131 is changed. Therefore, if the length of the connection member 141 is too short, the connection member 141 interferes with the movement of the development unit 230. In light thereof, the length of the connection member 141 is set so as not to interfere with the movement of the development unit 230. In the following description, the length of the connection member 141 according to the present exemplary embodiment will be described.

Assume that a distance D1 (a first distance) represents the distance between the connector 131 of the control board 100 and the connector 152 of the detection unit 150 when the development unit 230 is located at the abutment position as illustrated in FIG. 2. Assume that a distance D2 (a second distance) represents the distance between the connector 131 of the control board 100 and the connector 152 of the detection unit 150 when the development unit 230 is located at the separation position as illustrated in FIG. 3. The length of the connection member 141 is longer than both the distance D1 and the distance D2 so as not to interfere with the movement of the development unit 230. Further, the connection member 141 is desirably flexible.

The distance between the connector 131 and the connector 152 specifically refers to the shortest distance between the portions thereof where the connection member 141 is inserted. Further, the length of the connection member 141 refers to the length from the connector 131 to the connector 152 along the surface of the connection member 141.

Further, the distance D1 is longer than the distance D2 in the present exemplary embodiment. In other words, the length of the connection member 141 is longer than the distance D1.

As described above, when the development unit 230 is moved, the detection unit 150 is also moved in conjunction therewith. At this time, a resilient force with which the connection member 141 is biased to return to the initial position acts on the connector 152 of the detection unit 150, and thus an opposite force is applied in the movement direction of the development unit 230. If the resilient force of the connection member 141 exceeds the force for moving the development unit 230, the development unit 230 cannot be moved to a desired position, and the abutment/separation operation of the development unit 230 is hindered.

In light thereof, the resilient force of the connection member 141 can be reduced so as not to interfere with the movement of the development unit 230 by causing the connection member 141 to have a length longer than the distance D1 and the distance D2. In other words, the length of the connection member 141 is set to a distance equal to or longer than D1 and D2.

The connection member 141 desirably has a longer length than a longer one of the distance D1 and the distance D2. In the present exemplary embodiment, the length of the connection member 141 is set in such a manner that the difference between the connection member 141 and the distance D1 exceeds the difference between the distance D1 and the distance D2. Further, since the connection member 141 has the extra length, the connection member 141 may be attached to the connector 152 and the connector 131 while being partially bent. At this time, the influence exerted on the connector 152 by the resilient force of the connection member 141 generated during the movement of the development unit 230 can be minimized by disposing the bent portion of the connection member 141 closer to the connector 152 than to the connector 131. In other words, the bent portion of the connection member 141 is desirably disposed in such a manner that the distance between the bent portion and the connector 152 is shorter than the distance between the bent portion and the connector 131.

In this manner, according to the configuration of the present exemplary embodiment, in which the detection unit 150 is mounted on the development unit 230, misalignment among the light emitting unit 51*a*, the light receiving unit 51*b*, and the development unit 230 can be prevented even when the development unit 230 is moved between the abutment position and the separation position. Further, due to the connection member 141 having a sufficient length, the abutment/separation operation of the development unit 230 is prevented from being interfered with by the connection member 141.

The connection member 141 is used to connect the detection unit 150 for detecting the toner remaining amount and the control board 100 in the present exemplary embodiment, but may be used as a portion connecting a portion having another function and the housing 72.

Further, due to the length of the connection member 141 longer than the distance D1 and the distance D2, the electric connection between the connector 131 and the connector 152 is maintained both when the development unit 230 is located at the abutment position and when the development unit 230 is located at the separation position. Therefore, the control unit 199 can detect the toner remaining amount both in the state that the development unit 230 is located at the abutment position and in the state that the development unit 230 is located at the separation position.

In a second exemplary embodiment, a description will be given of an image forming apparatus 1A configured partially differently from the image forming apparatus 1 according to the first exemplary embodiment, and a development unit 230A. The description and illustration of a configuration similar to that described in the first exemplary embodiment may be omitted, and components similar to those described in the first exemplary embodiments may be assigned the same reference numerals and signs in the description and illustration.

The image forming apparatus 1A according to the present exemplary embodiment includes the development unit 230A. As will be described below, the development unit 230A includes a reception portion 202 to which a replenishment pack (a replenishment container) 210 for replenishing toner into the containing portion 18 is detachably attached, in addition to the configuration of the development unit 230 according to the first exemplary embodiment. The detection unit 150 is also mounted on the development unit 230A similarly to the first exemplary embodiment. In the following description, the image forming apparatus 1A according to the present exemplary embodiment will be described with reference to FIGS. 8A to 8C and 9.

Figure 8A:
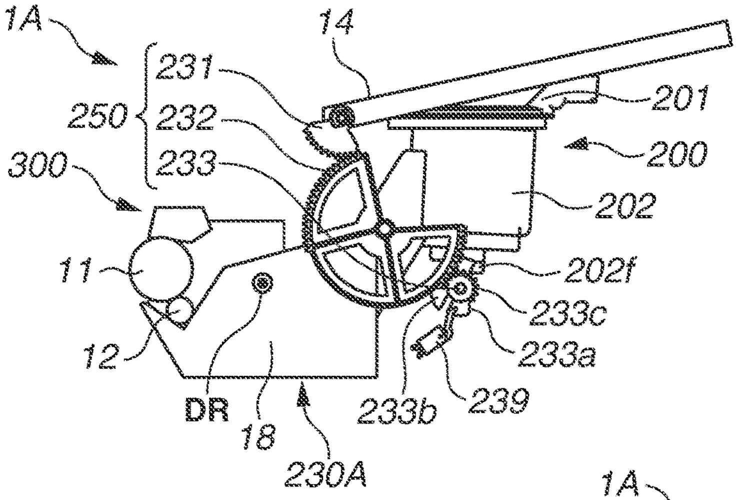
FIG. 8A illustrates a support unit in a retraction state.
Figure 8B:
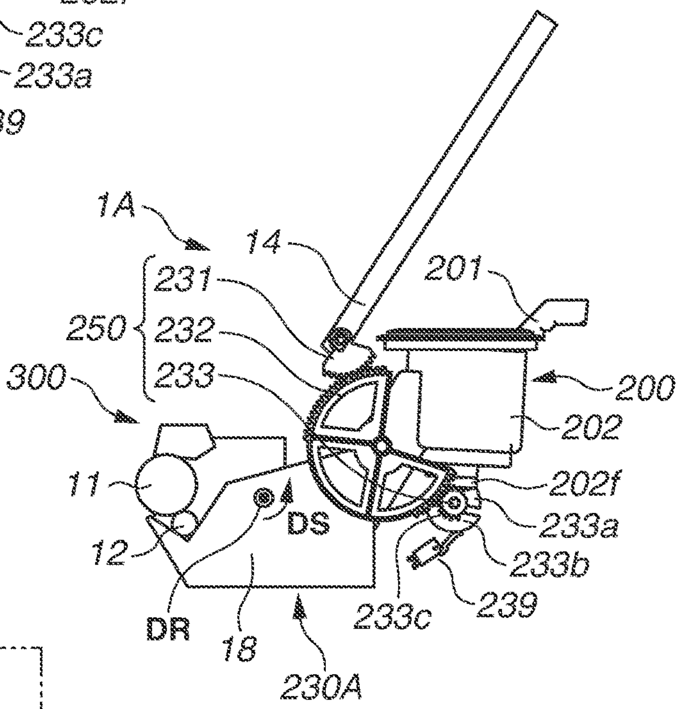
FIG. 8B illustrates the support unit in a support start state.
Figure 8C:
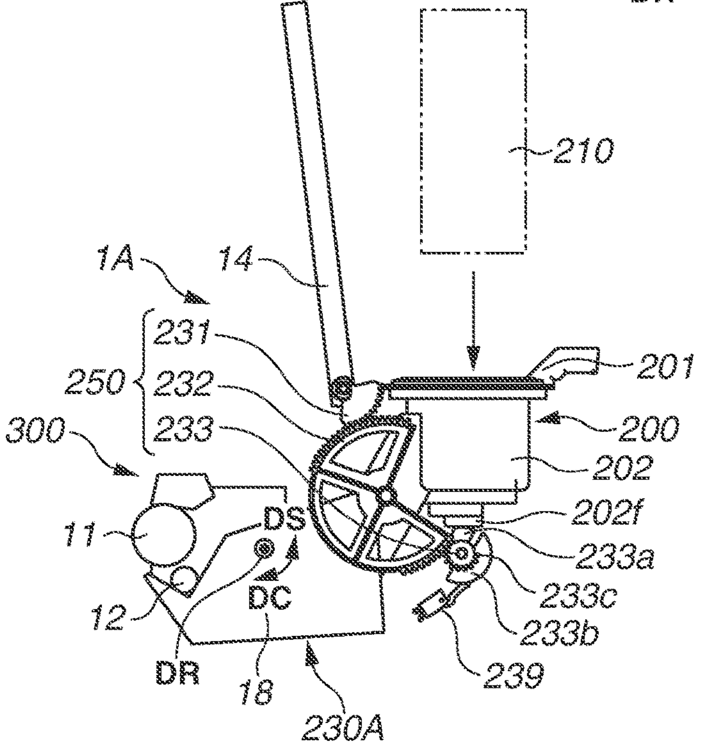
FIG. 8C illustrates the support unit in a support state.

FIGS. 8A to 8C illustrate a support unit 250. FIG. 8A illustrates the support unit 250 in a retraction state. FIG. 8B illustrates the support unit 250 in a support start state. FIG. 8C illustrates the support unit 250 in a support state. FIGS. 8A, 8B, and 8C are side views as viewed along the direction of the rotational axis of the photosensitive drum 11.

As described above, the development unit 230A according to the present exemplary embodiment includes the reception portion 202 to which a replenishment pack 210 is attached. On the other hand, an attachment portion 201 is provided to the housing 72 of the image forming apparatus 1A according to the present exemplary embodiment. A replenishment portion 200 is formed by the reception portion 202 and the attachment portion 201.

The discharge tray 14 provided to the housing 72 of the image forming apparatus 1A is an opening/closing member configured movably between a cover position (FIG. 8A), at which the discharge tray 14 covers the reception portion 202 and the attachment portion 201, and an exposure position (FIG. 8C), at which the discharge tray 14 exposes the reception portion 202 and the attachment portion 201. Moving the discharge tray 14 to the exposure position causes the reception portion 202 and the attachment portion 201 to be exposed, thereby allowing a replenishment pack 210 to be attached to the reception portion 202 and the attachment portion 201.

The replenishment pack 210 contains toner. The replenishment pack 210 is attached to the reception portion 202 and the attachment portion 201, and by operating a lever 201*a* (FIG. 9) of the attachment portion 201, the shutter of the replenishment pack 210 is opened and the toner is replenished from the replenishment pack 210 into the containing portion 18.

The operation of the development unit 230A when the discharge tray 14 is opened and closed to replenish toner will be described with reference to FIGS. 8A to 8C.

The support unit 250 is provided inside the housing 72 of the image forming apparatus 1A according to the present exemplary embodiment. The replenishment pack 210 is inserted into the reception portion 202. At this time, a force for attaching the replenishment pack 210 is applied to the reception portion 202 of the development unit 230A. A movement of the development unit 230A can be prevented by the support unit 250 supporting the development unit 230A when the replenishment pack 210 is attached.

When the replenishment pack 210 is attached to the replenishment portion 200, the discharge tray 14 is opened. The development unit 230A is supported by the support unit 250 in conjunction with the operation of opening the discharge tray 14. As a result, the orientation of the development unit 230A can be stabilized when the replenishment pack 210 is attached.

The support unit 250 includes a tray gear (a driving member or a driving gear) 231, an idler gear (an intermediate member) 232, and a support member (a movement member) 233. The tray gear 231 and the idler gear 232 have a function as a linkage portion (a linkage member) that links the discharge tray 14 and the support member 233 in such a manner that the discharge tray 14 and the support member 233 are interlocked.

The replenishment pack 210 is attached to the reception portion 202 from above in the vertical direction. The support member 233 supports the reception portion 202 from below in the vertical direction. The support member 233 includes a first cam portion 233*a* serving as a support portion located below the reception portion 202 in the vertical direction and supporting the development unit 230A, and a gear portion 233*c* meshed with the idler gear 232.

The tray gear 231 is fixed to the discharge tray 14, and is pivotally moved in conjunction with the opening/closing of the discharge tray 14. The tray gear 231 is engaged with a shaft provided at the pivotal center of the discharge tray 14. The support member 233 is coupled to the tray gear 231 via the idler gear 232. The support member 233 is configured movably between a support position, at which the first cam portion 233*a* comes into contact with and supports the development unit 230A, and a retraction position, at which the support member 233 is retraced from the support position. The support member 233 is moved between the support position and the retraction position in conjunction with the movement of the discharge tray 14. The state in which the support member 233 is located at the support position will be referred to as a support state of the support member 233 and the support unit 250. The state in which the support member 233 is located at the retraction position will be referred to as a retraction state of the support member 233 and the support unit 250.

When the discharge tray 14 is located at the exposure position, the support member 233 and the support unit 250 are in the support state and the support member 233 is located at the support position. When the discharge tray 14 is located at the cover position, the support member 233 and the support unit 250 are in the retraction state and the support member 233 is located at the retraction position.

The development unit 230A is configured pivotally relative to the photosensitive unit 300 about an axis DR extending in the pivotal axis direction. The development unit 230A is moved between the abutment position and the separation position by being moved pivotally about the axis DR. When the development unit 230A is moved in a DC direction, the development roller 12 is moved toward the photosensitive drum 11. When the development unit 230A is moved in a DS direction, the development roller 12 is moved away from the photosensitive drum 11.

When being located at the support position, the support member 233 can support the development unit 230A. In this state, the development unit 230A is located at the separation position, and the development roller 12 is separated from the photosensitive drum 11.

When the support member 233 is located at the retraction position, the first cam portion 233*a* of the support member 233 is separated from the development unit 230A. The development roller 12 is located at the position where the development roller 12 can develop the electrostatic latent image formed on the photosensitive drum 11 (the position where the development roller 12 is in abutment with the photosensitive drum 11). In other words, the development unit 230A is located at the abutment position.

The control unit 199 of the image forming apparatus 1A permits the image forming operation to be performed in the state that the support member 233 is located at the retraction position. The control unit 199 restricts the image forming operation from being performed in the state that the support member 233 is located at the support position.

In other words, the control unit 199 permits the image forming operation to be performed in the state that the discharge tray 14 is located at the cover position. The control unit 199 restricts the image forming operation from being performed in the state that the discharge tray 14 is located at the exposure position.

The image forming apparatus 1A includes an opening/closing sensor (an output unit or a detection unit) 239 configured to output a signal in accordance with the position of at least any one of the support member 233 or the discharge tray 14. Because the discharge tray 14 and the support member 233 operate in conjunction with each other, it can be said that the opening/closing sensor 239 outputs a signal in accordance with the position of the support member 233 and it can also be said that the opening/closing sensor 239 outputs a signal in accordance with the position of the discharge tray 14. Therefore, by detecting the position of any one of the discharge tray 14 and the support member 233 using the opening/closing sensor 239, the image forming apparatus 1A can detect the position of the other one of the discharge tray 14 and the support member 233. In the present exemplary embodiment, the control unit 199 is configured to permit or restrict the execution of the image forming operation based on the output (the signal) of the opening/closing sensor 239.

The reception portion 202 is provided with a support target portion 202*f*. As described above, when the discharge tray 14 is closed, the first cam portion 233*a* of the support member 233 is in the state of being separated from the support target portion 202*f* of the development unit 230A (refer to FIG. 8A). At this time, the development unit 230A is located at the abutment position, at which the development roller 12 is in abutment with the photosensitive drum 11. Since the first cam portion 233*a* is separated from the support target portion 202*f*, the photosensitive drum 11 and the development roller 12 can be stably kept in abutment with each other and the development roller 12 is set in a state of being able to develop the electrostatic latent image.

As illustrated in FIG. 8A, the opening/closing sensor 239 and the second cam portion 233*b* are separated from each other when the discharge tray 14 is located at the cover position and the support member 233 is located at the retraction position. At this time, the state of the signal of the opening/closing sensor 239 is an OFF state (a first state). At this time, the control unit 199 permits the image forming operation to be performed.

As illustrated in 8C, the opening/closing sensor 239 is in contact with the second cam portion 233*b* when the discharge tray 14 is located at the exposure position and the support member 233 is located at the support position. At this time, the state of the signal of the opening/closing sensor 239 is an ON state (a second state). The second state is a state different from the first state. At this time, the control unit 199 restricts the image forming operation from being performed.

In sum, the control unit 199 can control the image forming apparatus 1A so as to prohibit the image forming apparatus 1A from starting the image forming operation with the opening/closing sensor 239 in the ON state.

When the discharge tray 14 is opened (i.e., when the discharge tray 14 is located at the exposure position), the support member 233 is located at the support position and the development unit 230A is located at the retraction position, at which the development unit 230A is retracted from the abutment position. At this time, the development roller 12 is separated from the photosensitive drum 11. Also, the reception portion 202 is engaged with the attachment portion 201, and the user can replenish the toner by attaching the replenishment pack 210 to the replenishment portion 200.

When the user attaches the replenishment pack 210 to the reception portion 202, the development unit 230A receives a force in the direction DC in which the development roller 12 comes close to the photosensitive drum 11. At this time, the development unit 230A is supported by the support member 233, and this can stabilize the orientation of the development unit 230A, thereby allowing the replenishment pack 210 to be stably attached. Further, the development roller 12 can be prevented from being pressed against the photosensitive drum 11 when the replenishment pack 210 is attached.

Figure 9:
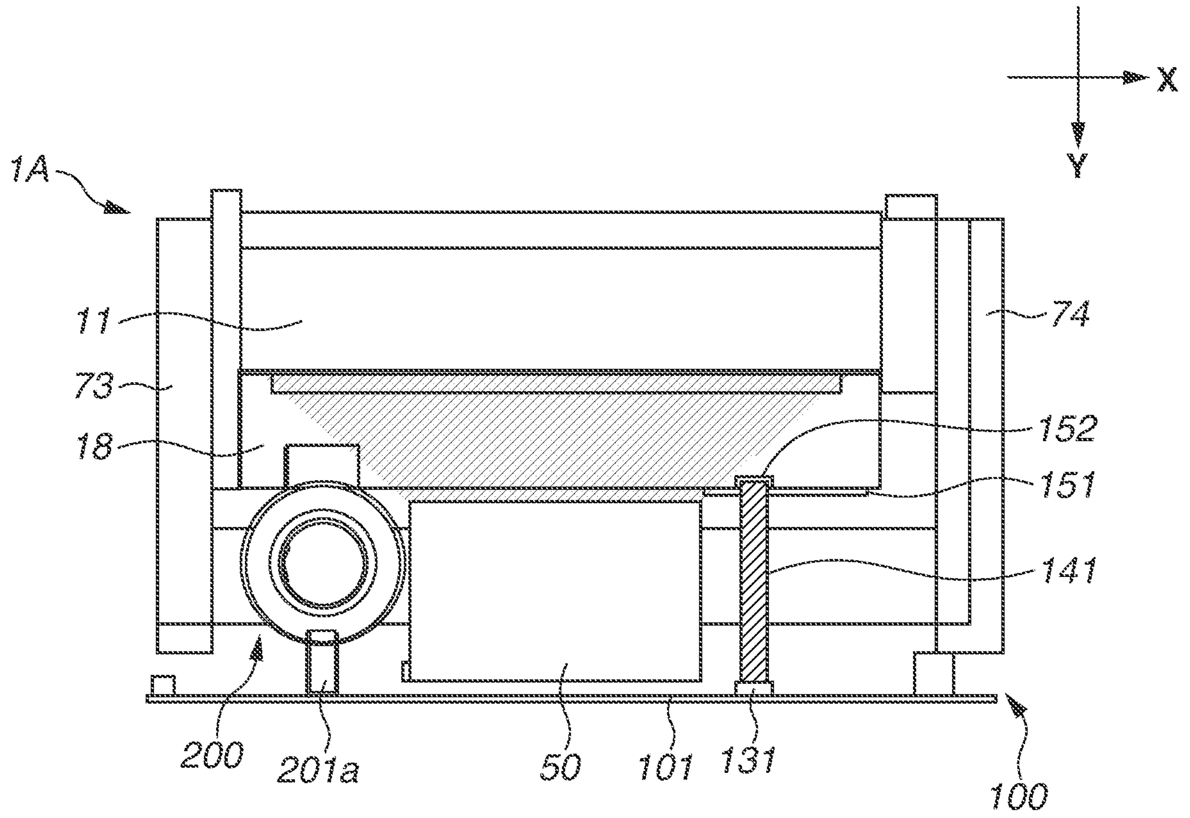
FIG. 9 is a top view of an image forming apparatus according to a second exemplary embodiment.

FIG. 9 is a top view of the image forming apparatus 1A according to the present exemplary embodiment. The connector 131, the connector 152, and the connection member 141 according to the present exemplary embodiment are disposed at positions closer to the center of the housing 72 (the center of the image forming apparatus 1A) than in the first exemplary embodiment.

The length of the connection member 141 is also longer than the distance D1 and the distance D2 in the present exemplary embodiment. Further, the distance D1 is also longer than the distance D2 in the present exemplary embodiment.

As illustrated in FIG. 9, the connection member 141 according to the present exemplary embodiment is disposed near the region irradiated with the laser emitted from the scanner unit 50. Therefore, if the length of the connection member 141 is too long, the connection member 141 undesirably interferes with the irradiation of the laser.

In light of the situation, in the present exemplary embodiment, a movable flexible flat cable is used as the connection member 141. More specifically, when a force is applied to the connection member 141 during the movement of the development unit 230A, the connection member 141 is deformed and the generation of the resilient force can be suppressed thereby.

Figure 10:
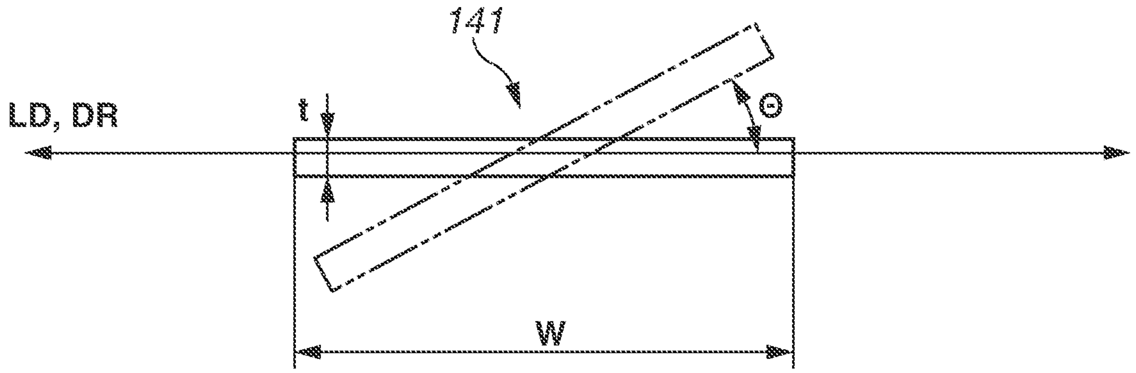
FIG. 10 illustrates the layout of a connection member according to the second exemplary embodiment.

The layout of the connection member 141 will be described in further detail with reference to FIG. 10. FIG. 10 illustrates the layout of the connection member 141 according to the present exemplary embodiment.

Assume that the length direction of the connection member 141 is a direction extending from the connector 131 to the connector 152 along the surface of the connection member 141. FIG. 10 is a cross-sectional view of the connection member 141 in a direction perpendicular to the length direction. A width W of the connection member 141 is greater than a thickness t of the connection member 141 in the direction perpendicular to the length direction.

As described above, the development unit 230A is pivotal about the axis DR extending in the pivotal axis direction. The pivotal axis direction of the axis DR is in parallel with the longitudinal direction LD.

The connection member 141 is easily deformed when the development unit 230A is pivotally moved by being arranged in such a manner that the direction of the width W (a width direction) of the connection member 141 and the pivotal axis direction of the axis DR extend in parallel with each other. Therefore, the resilient force received from the connection member 141 when the development unit 230A is pivotally moved can be suppressed to a low level.

Further, the connection member 141 is prevented from being moved in the longitudinal direction when the connection member 141 is deformed by being arranged in such a manner that the width direction of the connection member 141 and the longitudinal direction LD extend in parallel with each other. Therefore, the connection member 141 can be prevented from overlapping the region irradiated with the laser.

From the above-described viewpoint, it is desirable that an angle θ defined between the width direction of the connection member 141 and the pivotal axis direction of the axis DR is small. The angle θ described here refers to the narrower one of the angle formed between the width direction of the connection member 141 and the pivotal axis direction of the axis DR. Further, it is desirable that an angle θ defined between the width direction of the connection member 141 and the longitudinal direction LD is small. The angle θ described here refers to the narrower one of the angle formed between the width direction of the connection member 141 and the longitudinal direction LD. The degree of the angles θ are desirably 45° or smaller. The degree of the angles θ are desirably set to the degree indicated here even in a case where the development unit 230A does not include the reception portion 202.

In this manner, according to the configuration of the present exemplary embodiment, in which the detection unit 150 is mounted on the development unit 230A, misalignment among the light emitting unit 51*a*, the light receiving unit 51*b*, and the development unit 230A can be prevented even when the development unit 230A is moved between the abutment position and the separation position. Further, due to the connection member 141 having a sufficient length, the abutment/separation operation of the development unit 230A is prevented from being interfered with by the connection member 141.

Further, due to the length of the connection member 141 longer than the distance D1 and the distance D2, the electric connection between the connector 131 and the connector 152 is maintained both when the development unit 230A is located at the abutment position and when the development unit 230A is located at the separation position. Therefore, the control unit 199 can detect the toner remaining amount both in the state that the development unit 230A is located at the abutment position and in the state that the development unit 230A is located at the separation position. In other words, the amount of toner in the containing portion 18 can be detected in a state that toner is being replenished from the replenishment pack 210. This allows the image forming apparatus 1A to present information relating to the replenishment of toner from the replenishment pack 210 to the user and perform control relating to the replenishment of toner from the replenishment pack 210.

In the above-described manner, according to the exemplary embodiments of the present disclosure, an image forming apparatus including a movably configured development unit can prevent a variation in the positions of a light emitting element and a light receiving element relative to the development unit.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-191854, filed Nov. 26, 2021, which is hereby incorporated by reference herein in its entirety.

What is claimed is:

1. An image forming apparatus configured to form an image on a recording material, the image forming apparatus comprising:

a housing including a first connector;

a drum unit including a photosensitive drum, the drum unit being contained in the housing;

a development unit including a containing portion containing toner and a development roller configured to supply the toner to the photosensitive drum, the development unit being contained in the housing and movable relative to the drum unit between (i) an abutment position at which the development roller is in abutment with the photosensitive drum and (ii) a separation position at which the development roller is separated from the photosensitive drum;

a light emitting element mounted on the development unit;

a light receiving element mounted on the development unit, the light receiving unit being configured to receive light emitted from the light emitting element and transmitted through the containing portion;

a second connector mounted on the development unit, the second connector being electrically connected to the light emitting element and the light receiving element; and a connection member connected to the first connector and the second connector so that the first connector and the second connector are electrically connected to each other, wherein the second connector is displaced relative to the first connector when the development unit is moved between the abutment position and the separation position, and wherein a length of the connection member is longer than a first distance from the first connector to the second connector when the development unit is located at the abutment position, and is longer than a second distance from the first connector to the second connector when the development unit is located at the separation position.

2. The image forming apparatus according to claim 1, further comprising:

a first board on which the first connector is mounted; and a second board on which the light emitting element, the light receiving element, and the second connector are mounted, wherein the first board and the second board face each other when the development unit is located at, at least one of the abutment position and the separation position.

3. The image forming apparatus according to claim 1, wherein the connection member is flexible.

4. The image forming apparatus according to claim 3, wherein, if a direction extending from the first connector to the second connector along a surface of the connection member is a length direction of the connection member, a width of the connection member is greater than a thickness of the connection member in a direction perpendicular to the length direction.

5. The image forming apparatus according to claim 4, wherein the development unit is configured pivotally, relative to the drum unit, about an axis extending in a pivotal axis direction, and wherein an angle between the width direction of the connection member and the pivotal axis direction is less than or equal to 45°.

6. The image forming apparatus according to claim 1, wherein the development unit includes a reception portion to which a replenishment container for replenishing toner into the containing portion is detachably attached, wherein the housing includes an opening/closing member and a support member, the opening/closing member being movable between a cover position at which the opening/closing member covers the reception portion and an exposure position at which the opening/closing member exposes the reception portion, the support member being movable between a support position at which the support member supports the development unit and a retraction position at which the support member is retracted from the support position in conjunction with movement of the opening/closing member, and wherein the support member is located at the support position when the opening/closing member is located at the exposure position, and the support member is located at the retraction position when the opening/closing member is located at the cover position.

7. The image forming apparatus according to claim 1, wherein the first distance is longer than the second distance.

8. The image forming apparatus according to claim 1, further comprising a control unit configured to perform a detection operation to detect an amount of the toner contained in the containing portion based on a signal output from the light receiving element.

9. The image forming apparatus according to claim 8, wherein the control unit is configured to perform the detection operation both in a state that the development unit is located at the abutment position and in a state that the development unit is located at the separation position.

10. An image forming apparatus configured to form an image on a recording material, the image forming apparatus comprising:

a housing including a first connector;

a drum unit including a photosensitive drum, the drum unit being contained in the housing;

a development unit including a containing portion containing toner and a development roller configured to supply the toner to the photosensitive drum, the development unit being contained in the housing and movable relative to the drum unit between (i) a first position and (ii) a second position;

a light emitting element mounted on the development unit;

a light receiving element mounted on the development unit, the light receiving unit being configured to receive light emitted from the light emitting element and transmitted through the containing portion;

a second connector mounted on the development unit, the second connector being electrically connected to the light emitting element and the light receiving element; and a connection member connected to the first connector and the second connector so that the first connector and the second connector are electrically connected to each other, wherein the second connector is displaced relative to the first connector when the development unit is moved between the first position and the second position, and wherein a length of the connection member is longer than a first distance from the first connector to the second connector when the development unit is located at the first position, and is longer than a second distance from the first connector to the second connector when the development unit is located at the second position.

11. The image forming apparatus according to claim 10, further comprising:

a first board on which the first connector is mounted; and a second board on which the light emitting element, the light receiving element, and the second connector are mounted, wherein the first board and the second board face each other when the development unit is located at, at least one of the first position and the second position.

12. The image forming apparatus according to claim 10, wherein the connection member is flexible.

13. The image forming apparatus according to claim 12, wherein, if a direction extending from the first connector to the second connector along a surface of the connection member is a length direction of the connection member, a width of the connection member is greater than a thickness of the connection member in a direction perpendicular to the length direction.

14. The image forming apparatus according to claim 13, wherein the development unit is configured pivotally, relative to the drum unit, about an axis extending in a pivotal axis direction, and wherein an angle defined between a width direction of the connection member and the pivotal axis direction is less than or equal to 45°.

15. The image forming apparatus according to claim 10, wherein the development unit includes a reception portion to which a replenishment container for replenishing toner into the containing portion is detachably attached, wherein the housing includes an opening/closing member and a support member, the opening/closing member being movable between a cover position at which the opening/closing member covers the reception portion and an exposure position at which the opening/closing member exposes the reception portion, the support member being movable between a support position at which the support member supports the development unit and a retraction position at which the support member is retracted from the support position in conjunction with movement of the opening/closing member, and wherein the support member is located at the support position when the opening/closing member is located at the exposure position, and the support member is located at the retraction position when the opening/closing member is located at the cover position.

16. The image forming apparatus according to claim 10, wherein the first distance is longer than the second distance.

17. The image forming apparatus according to claim 10, further comprising a control unit configured to perform a detection operation to detect an amount of the toner contained in the containing portion based on a signal output from the light receiving element.

18. The image forming apparatus according to claim 17, wherein the control unit is configured to perform the detection operation in a state that the development unit is located at the first position and in a state that the development unit is located at the second position.

* * * * *